Nov. 23, 1971  A. A. BLATZ  3,621,769
CONTINUOUS RAPID ACCESS FILM PROCESSOR
Filed Oct. 14, 1968  2 Sheets-Sheet 1

INVENTOR
ANDREW A. BLATZ

BY

ATTORNEY

United States Patent Office 3,621,769
Patented Nov. 23, 1971

3,621,769
CONTINUOUS RAPID ACCESS FILM PROCESSOR
Andrew A. Blatz, Cinnaminson, N.J., assignor to the United States of America as represented by the Department of the Navy
Filed Oct. 14, 1968, Ser. No. 767,177
Int. Cl. G03b 17/50
U.S. Cl. 95—14
6 Claims

ABSTRACT OF THE DISCLOSURE

An information transfer system to receive radio signals and convert them to light waves which impinge a photographic film. A processing film is brought into laminating contact with the exposed film to develop it and during the laminating contact the films are heated after which they are delaminated and wound on separate rolls. The processing film in the form of a positive print is viewed and stored. The photographic film, which is the negative, is also stored for future use The process is continuous and the system provides a permanent record within minutes of the receipt of the information.

STATEMENT OF GOVERNMENT INTEREST

The invention defined herein may be manufactured and used by or for the Government of the United States of America for governmental purposes without the payment of any royalties thereon or therefor.

SUMMARY OF THE INVENTION

It has been found highly desirable to be able to both view and retain for a permanent record certain information, such as the information sent out from a sonar buoy. This information transformed into light waves is directed onto a photographic film, which is immediately developed by contact with a processing film. This development is accomplished by laminating the two films together for a short period of time with accompanying heat and pressure and delaminating the films after a few seconds.

A more detailed discussion of this type of transfer processing system can be found in a brochure distributed by the Eastman-Kodak Company entitled "An Introduction to the Kodak BIMAT Transfer Processing System, No. p65, dated October 1965 or an article from The SPSE (Society of Photographic Scientist and Engineers( Reporter entitled "BIMAT—A New Processing System," vol. 21, No. 3, December 1963. The negative film is wound on a roll for storage or future use, while the processing film, as a positive print, is passed under a viewing glass and then rolled for storage or future use.

An object of this invention is to provide an apparatus which will transfer certain information to a strip of photographic film, process the film, present a positive print for inspection and store both the negative and positive films for future use.

A further object of the present invention is to provide means for exposing a photographic film to a light source having a pattern which is transferred to the film in a continuous manner and to provide a processing film which is brought into laminating contact with the exposed film and during the laminating contact the films are heated to a determined degree of temperature after which they are delaminated and wound on separate rolls.

A still further object of the present invention is to provide rollers over which the films are passed in the laminating operation and to support these rollers so that there is even contact throughout their length by means of suporting rotatable discs in contact with the rollers.

A still further object of the present invention is to provide a pair of supporting belts which serve to support the photographic film and the processing film throughout part of their travel and which transfer the heat from a platen to the films and assist in supplying the pressure to the films during the laminating stage.

It is a still further object of the present invention to provide a means of viewing the processing film immediately after delamination, at which time the processing film presents a positive print.

Other objects, advantages and novel features of the present invention will become apparent from the following detailed description of the invention when considered in conjunction with the accompanying drawings.

DESCRIPTION OF THE DRAWINGS

The invention is illustrated in the accompanying drawings in which.

DESCRIPTION OF THE PREFERRED EMBODIMENTS

Figure 2:
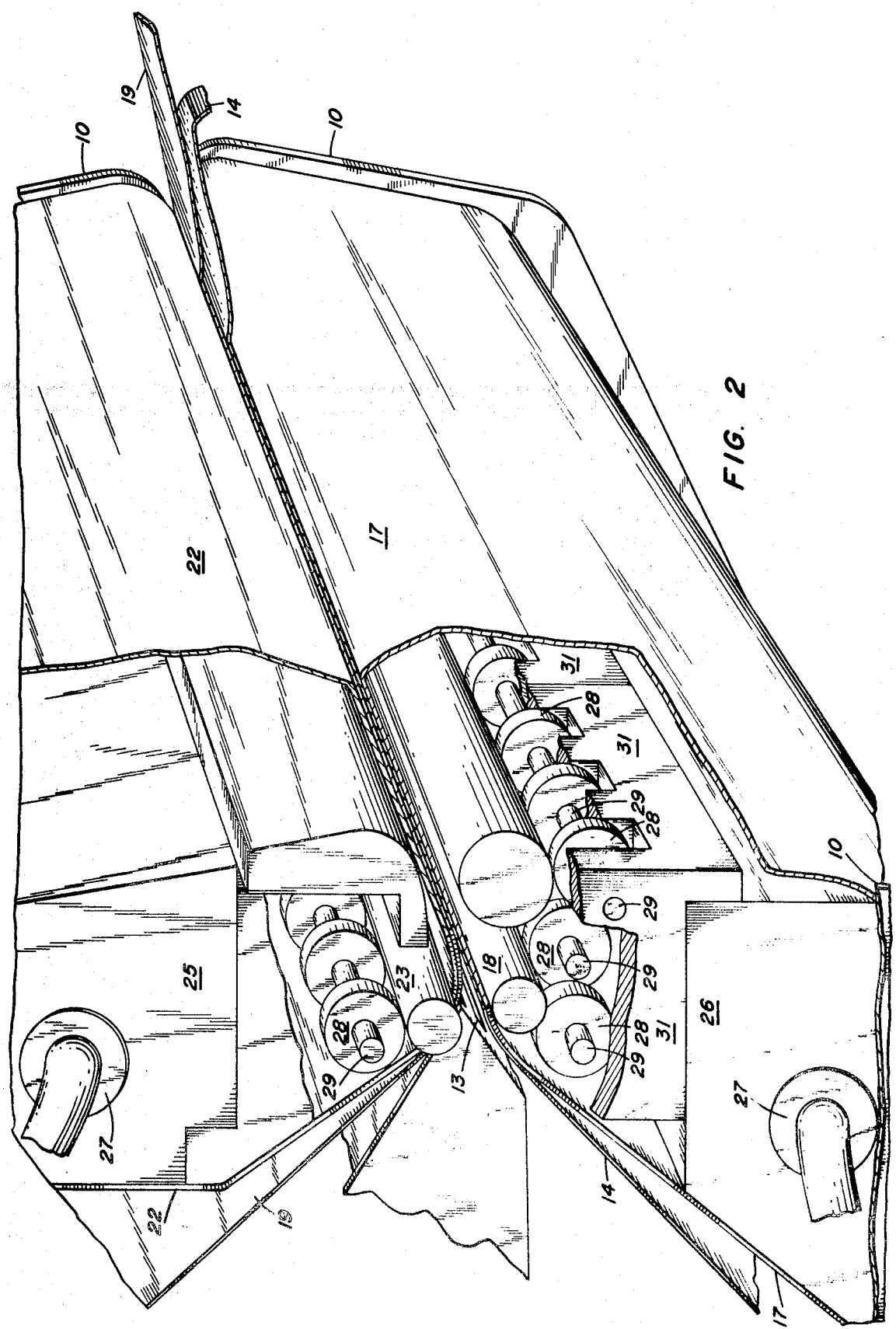
FIG. 2 is an enlarged detailed perspective, with certain parts broken away, of that section of the apparatus at which the exposure, lamination, and development takes place, as well as the supporting structure for the rollers.

Referring to the drawings, similar parts are marked by like numbers although, in the diagrammatic view and the section shown in FIG. 2, the structure may be different.

Figure 1:
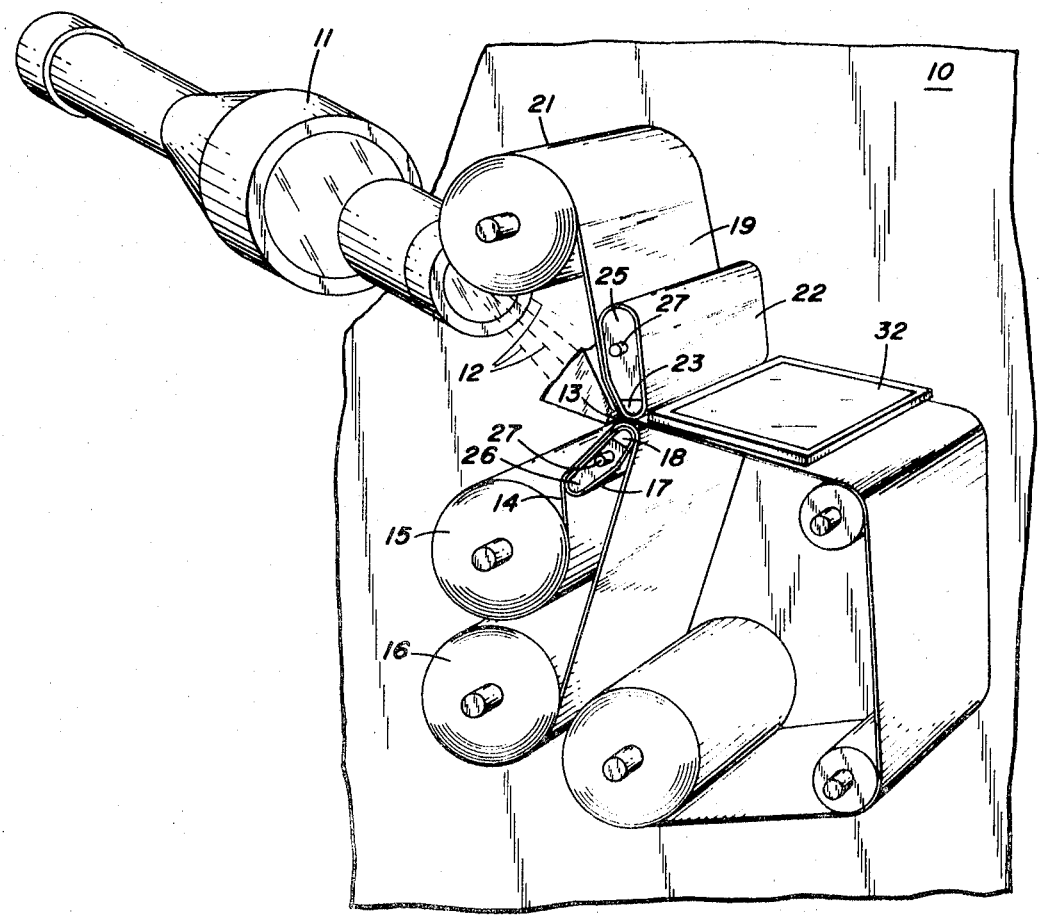
FIG. 1 is a diagrammatic view of the apparatus.

Referring to FIG. 1 where the apparatus is shown in diagrammatic form, a framework 10 supports the several axes and light source structure but is mainly omitted to present a clearer drawing, a cathode ray tube 11 or a galvanometer and a glow tube light receives signals from an information source such as a sonar buoy and transforms the signals into patterns of light rays 12 which are directed through a slit 13 onto a photographic film 14. The film originates in a roll 15 and ends in roll 16. Passing from roll 15 the film is supported by an endless belt 17 and moves across the slit 13 where it is exposed to the different patterns of light rays emitted from the source 11. Immediately after exposure the film passes over roller 18, still supported by the endess belt 17.

A processing film 19 originating in roll 21 and supported by endless belt 22 is brought into contact with the film 14 and it passes under roller 23. Roller 18 and 23 are separated just sufficiently to permit the two films with their supporting endless belts to pass through. The pressure of these two rollers exerted on the two films is sufficient to laminate the films together.

An upper shoe 25 and a lower shoe 26 support the endless belts 22 and 17, respectively. These shoes are heated by electric heaters 27 and in turn heat the endless belts which supply the laminated films with the necessary degree of temperature.

The rollers 18 and 23 are supported in parallel relation by a series of roller contacting discs 28. The discs 28 carried on shafts 29 are journaled in beds 31. The upper and lower shoe assemblies are pivoted about shafts near the upper edge of the upper shoe and the lower edge of the lower shoe and pivoting these shoes toward or away from each other with screws adjusts the pressure and distance. This adjustment means is not shown as it is old and well known to provide means for adjusting two opposing rollers to provide pressure for whatever is passing between the rollers. The discs 28 are set close together so that the rollers are supported without chance of bending.

After passing through the rollers the laminated films are delaminated, the processing film, which is of the type producing a positive print after the development process, passes under a window 32 permitting inspection of the data received within minutes of the reception while at the same time making a permanent record of such data.

The apparatus forming the subject of this invention provides a means of reviewing incoming data for instant information and at the same time using the same information carrier to provide a permanent record of the information.

Obviously many modifications and variations of the present invention are possible in the light of the above teachings. It is therefore to be understood that within the scope of the appended claims the invention may be practiced otherwise than as specifically described.

What is claimed as new is:

1. An apparatus for transferring information data from one medium to another medium, comprising:
   a light source for receiving information data and radiating said information data in the form of a pattern of light waves;
   a framework supporting said light source;
   a photographic film carried in a roll and supported by said framework, said photographic film continuously advancing across the path of said light waves and exposed to the pattern of said light waves;
   a processing film carried in a roll and supported by said framework being continuously brought into laminating contact with the photographic film immediately after exposure of the photographic film;
   first means for physically touching and supporting the processing film during part of its travel and particularly while in laminating contact with the photographic film;
   second means for physically touching and supporting the photographic film during part of its travel and particularly while in laminating contact with the processing film;
   said first and second touching and supporting means each comprising an endless belt for advancing the film, a stationary shoe for supporting the endless belt and a roller for rotating said endless belt to thereby advance said film; and
   means for heating both of said films during laminating contact supported by said first and second touching and supporting means for simultaneously developing both of said films.

2. An apparatus according to claim 1 wherein said heating means are supported by and heat said stationary shoes of said first and second touching and supporting means to thereby transfer heat to said endless belts which in turn transfer the heat to the photographic and processing films during their laminating contact.

3. An apparatus according to claim 2 and including means for delamination of the films after a time interval.

4. An apparatus according to claim 3 and including means underlying and supporting the rollers at a plurality of contact points to prevent any deformation of the rollers during the laminating contact.

5. An apparatus according to claim 4 wherein the roller supporting means comprises a series of discs underlying the rollers and arranged at spaced intervals to support the rollers and prevent any deformation of the roller during the laminating contact.

6. An apparatus according to claim 1 and including means for viewing the processing film immediately after delamination.

References Cited

UNITED STATES PATENTS

| | | | |
|---|---|---|---|
| 3,145,637 | 8/1964 | Frantz | 95—89 A |
| 3,359,404 | 12/1967 | Limberger | 95—89 X |
| 3,168,026 | 2/1965 | Limberger | 355—103 X |
| 3,249,434 | 5/1966 | Land et al. | 95—14 X |
| 3,264,961 | 8/1966 | Tuttle et al. | 95—14 X |
| 3,319,549 | 5/1967 | Jackson | 95—14 X |
| 3,354,804 | 11/1967 | Jones | 95—14 |

FOREIGN PATENTS

| | | | |
|---|---|---|---|
| 553,072 | 2/1958 | Canada | 95—14 |

SAMUEL S. MATTHEWS, Primary Examiner

R. M. SHEER, Assistant Examiner

U.S. Cl. X.R.

355—111